(12) United States Patent
Lu et al.

(10) Patent No.: US 10,887,103 B2
(45) Date of Patent: Jan. 5, 2021

(54) OPERATING METHOD FOR PUSH AUTHENTICATION SYSTEM AND DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 191 days.

(21) Appl. No.: 15/552,517

(22) PCT Filed: Feb. 24, 2016

(86) PCT No.: PCT/CN2016/074468
§ 371 (c)(1),
(2) Date: Aug. 22, 2017

(87) PCT Pub. No.: WO2016/134657
PCT Pub. Date: Sep. 1, 2016

(65) Prior Publication Data
US 2018/0337783 A1    Nov. 22, 2018

(30) Foreign Application Priority Data

Feb. 27, 2015  (CN) .......................... 2015 1 0089797
Sep. 18, 2015  (CN) .......................... 2015 1 0599096

(51) Int. Cl.
*H04L 9/32*       (2006.01)
*H04L 29/06*      (2006.01)

(52) U.S. Cl.
CPC .......... *H04L 9/3213* (2013.01); *H04L 9/3226* (2013.01); *H04L 9/3271* (2013.01);
(Continued)

(58) Field of Classification Search
CPC ... H04L 9/3213; H04L 9/3271; H04L 9/3226; H04L 63/102; H04L 63/0807; H04L 2209/80
(Continued)

(56) References Cited

U.S. PATENT DOCUMENTS

| 2014/0194097 A1 | 7/2014 | Gaddam et al. |
| 2015/0237038 A1* | 8/2015 | Grajek ................ H04L 63/0815 726/8 |
| 2018/0270067 A1* | 9/2018 | Woo ....................... H04L 9/0872 |

* cited by examiner

*Primary Examiner* — Brandon S Hoffman
*Assistant Examiner* — Nega Woldemariam
(74) *Attorney, Agent, or Firm* — Hammer & Associates, P.C.

(57) ABSTRACT

An operating method for a push authentication system and device, belonging to the field of information security. The method comprises: an application interface receiving user information and sending same to an application server; the application server sending the user information and an application identifier to an authentication server; the authentication server generating a push authentication request according to a generated challenge value, token information, the user information and an application name corresponding to the application identifier and sending same to a mobile terminal token; the mobile terminal token generating login information according to the push authentication request, and generating a first response value according to the challenge value when a user selects to confirm login and sending same to the authentication server; and the authentication server generating a second response value according to the challenge value, and returning a authentication success result to the application server when the first response value and the second response value are the same. The present invention can improve the data transmission speed of traditional authentication, and a user does not need to (Continued)

Figure 1:
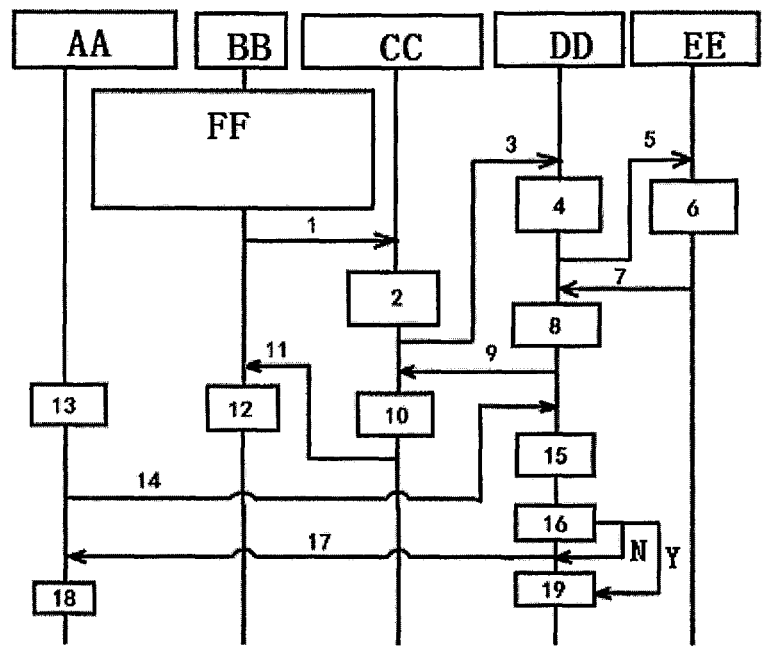

participate in the input of a password, thereby preventing the man-in-the-middle attack and improving the security of authentication.

20 Claims, 5 Drawing Sheets

(52) U.S. Cl.
CPC ........ *H04L 63/083* (2013.01); *H04L 63/0807* (2013.01); *H04L 63/102* (2013.01); *H04L 2209/80* (2013.01)

(58) Field of Classification Search
USPC ............................................................ 726/4
See application file for complete search history.

AA - the mobile terminal token;  BB - the client;  CC - the operation system server;
DD - the authentication server;  EE - the authentication database;
FF - when a user chooses to trigger the mobile terminal token in the browser of the client.

AA - the mobile terminal token;  DD - the authentication server;  EE - the authentication server.

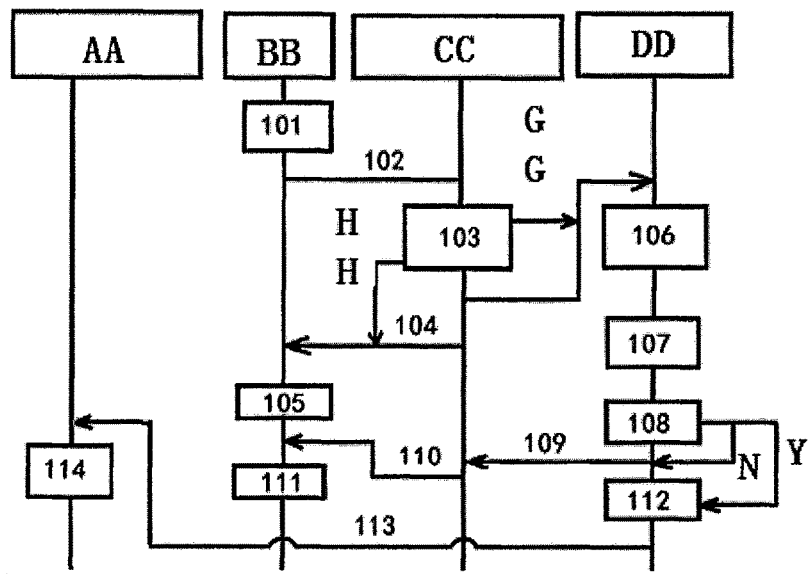
AA - the mobile terminal token;   BB - the client;   CC - the operation system server;
DD - the authentication server;   GG - the authentication is successful;
HH - the authentication is unsuccessful.
Fig. 2
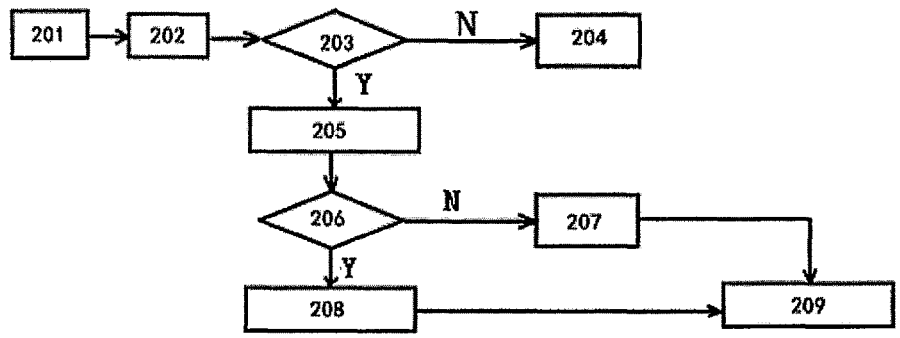
Fig. 3
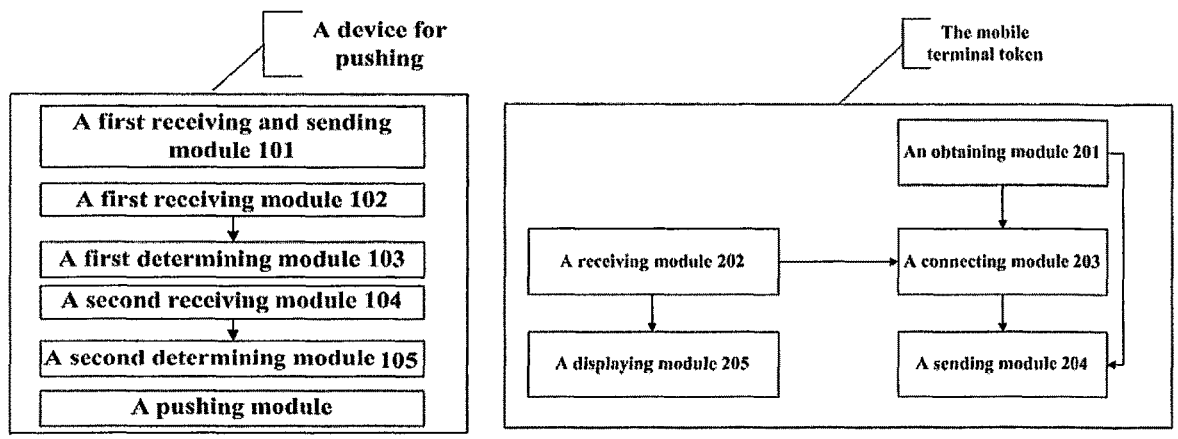
Fig. 4                                                     Fig. 5

II - the application interface;   JJ - the application server;
DD - the authentication server;  AA - the mobile terminal token.

II - the application interface;   JJ - the application server;
DD - the authentication server;  AA - the mobile terminal token.

II - the application interface;  JJ - the application server
DD - the authentication server;  AA - the mobile terminal token.

II - the application interface;  JJ - the application server;
DD - the authentication server;  AA - the mobile terminal token.

OPERATING METHOD FOR PUSH AUTHENTICATION SYSTEM AND DEVICE

FIELD OF THE INVENTION

The present invention relates to a working method of pushing an authentication device and a system thereof, which belongs to the field of information security.

PRIOR ART

A mobile device token, which is also called as a dynamic password mobile device token, is a client software of a mobile device which is configured to generate a dynamic password, in which the mobile device includes a mobile phone or pad, etc; the mobile device token generates a dynamic password via a program running in the mobile device, and an identification is authenticated by binding the dynamic password with the mobile device; the mobile device token is easier to use, more security, lower cost because no charge during the process of generating the password; and the mobile device token has no additional device, thus, it is easier to be obtained and does not need logistics; the mobile device token is becoming more and more popular in the time of 3G dynamic password identification authentication.

Pushing is an advanced connecting manner for communication between a sever and a client, which pushes data from the sever to the client continuously to improve interactive function between the client and the sever, in this way, pushing can satisfy multi-level demand of a user because the user can set info-channel needed by the user and receive a customized information from the client.

In prior art, a password is generated by being triggered by a user and is sent to a server to be authenticated in an authentication process and it needs the user to interact in the process, thus, the speed of authentication is slower and the authentication process is not safe; meanwhile, the authentication server pushes information to a mobile terminal according to a token serial number of a mobile terminal token which runs in the mobile terminal, a user can trigger and use the mobile terminal token in different mobile terminals when the user holds several mobile terminals, in this way, the authentication server records that a triggered mobile terminal token is used by a mobile terminal according to the token serial number, and the authentication server pushes the information to several mobile terminals successively when the authentication sever pushes a piece of information instead of pushing the information to the mobile terminal, in which the mobile terminal token currently triggered by the user accurately.

SUMMARY OF THE INVENTION

The object of the present invention is to provide a working method of a pushing authentication device and a system thereof, in which the method can speed up transmission of data in a traditional authentication, and a user does not need to input a password, in this way, the method makes the authentication more secure by protecting the authentication from attacking.

Thus, according to the first aspect of the invention, there is provided a working method of pushing an authentication system, which applies to a system composed of an application interface, an application server, an authentication server and a mobile terminal token, the method includes the following steps:

S1) receiving, by the application interface, user information input by a user, and sending the user information to the application server;

S2) generating, by the application server, an authentication request according to the user information and an application identification stored inside the application server after the user's information is received by the application server, and then sending the authentication request to the authentication server;

S3) generating, by the authentication server, a challenge value and storing the challenge value after the authentication request is received by the authentication server, obtaining the user information and the application identification from the authentication request, obtaining corresponding token information and a network data link according to the user information, and obtaining a corresponding application name according to the application identification;

S4) generating, by the authentication server, a pushing-authentication request according to the challenge value, the token information, the user information and the application name, and pushing the pushing-authentication request to a corresponding mobile terminal token via the network data link;

S5) generating, by the mobile terminal token, login information and displaying the login information according to the user information and the application name which are in the pushing-authentication request after the pushing-authentication request is received by the mobile terminal token, receiving a choice for the login information from the user, and executing Step S6 in the case that the user chooses login; otherwise, the process coming to an end;

S6) obtaining, by the mobile terminal token, the challenge from the pushing-authentication request, and computing the challenge value and a token seed key stored in the mobile terminal token to generate a first response value;

S7) generating, by the mobile terminal token, an authentication result including the first response value, and sending the authentication result to the authentication server via the network data link;

S8) obtaining, by the authentication server, the first response value after the authentication result is received by the authentication server, and obtaining a server seed key and challenge correspondingly stored, and computing the challenge and the server seed key to obtain a second response value;

S9) determining, by the authentication server, whether the first response value matches the second response value, if yes, returning an authentication result that the authentication is successful to the application server, and executing Step S10; otherwise, the process coming to an end;

S10) sending, by the application server, information that the authentication is successful to the application interface after the application server receives the authentication result that the authentication is successful; and S11) permitting, by the application interface, the user to access the application after the information that the authentication is received by the application interface, and the process coming to an end.

According to the second aspect of the present invention, there is provided a working method of an authentication server in a system for pushing authentication, which includes the following steps:

T1) generating, by the authentication server, a challenge value and storing the challenge value after an authentication request is received by the authentication server from an application server, and obtaining user information and an application identification from the authentication request;

T2) obtaining, by the authentication server, corresponding token information and a network data link according to the user information, and obtaining a corresponding application name according to the application identification;

T3) generating, by the authentication server, a request for pushing authentication according to the challenge value, the token information, the user information and the application name, and pushing the request for pushing authentication to a mobile terminal token via the network data link;

T4) receiving, by the authentication server, an authentication result returned from the mobile terminal token, obtaining a first response value from the authentication result, and obtaining a stored server seed key and the challenge value, and computing the challenge value and the server seed key to obtain a second response value; and T5) determining, by the authentication server, whether the first response value matches the second response value, if yes, returning an authentication result that the authentication is successful to the application server, then ending; otherwise, returning an authentication result that the authentication is unsuccessful to the application server, then ending.

According to the third aspect of the present invention, there is provided a working method of a mobile terminal token in a system for pushing authentication, which includes the following steps:

K1) receiving, by the mobile terminal token, a pushing-authentication request from an authentication server;

K2) obtaining, by the mobile terminal token, user information and an application name from the pushing-authentication request, and generating login information according to the user information and the application name and displaying the login information;

K3) receiving, by the mobile terminal token, a choice for the login information from the user, executing Step K4 in the case that the user chooses login; otherwise, the process coming to an end;

K4) obtaining, by the mobile terminal token, a challenge value from the pushing-authentication request, obtaining a stored token seed key, and computing the challenge value and the token seed key so as to generate a first response value; and K5) obtaining, by the mobile terminal token, token information from the pushing-authentication request, and generating an authentication result that login is permitted according to the first response value and the token information, and sending the authentication result to the authentication server via the network data link, and the operations by the token coming to an end.

According to the fourth aspect of the present invention, there is provided a device for realizing pushing, which includes:

a first receiving and sending module, which is configured to receive a triggering request from an operation system server, obtain a user identification (ID) from the triggering request, generate a request identification, and bind the request identification with the user ID and store them, obtain user information from authentication database according to the user ID, and generate a triggering request response according to the user information and the request identification and return the triggering request response to the operation system server; or to receive an obtaining-trigger-two-dimension-code request, and obtain the user ID from the obtaining-trigger-two-dimension-code request, and generate the request identification, and bind the request identification with the user ID and store them, and obtain the user information from the authentication database according to the user ID, and generate a trigger two-dimension code according to the user information and the request identification, and return the trigger two-dimension code to the client;

a first receiving module, which is configured to receive an obtaining trigger information request from the mobile terminal token, and obtain a device identification and the request identification from the obtaining trigger information request;

a first determining module, which is configured to determine whether the request identification obtained by the first receiving module is stored in a cache, if yes, obtain a user ID which is bound with the request identification, and obtain user token information from the authentication data base according to the user ID, and obtain a token serial number which relates to the device identification according to the device identification obtained by the first receiving module and the user token information, and send the token serial number to the mobile terminal token; otherwise, return error message to the mobile terminal token;

a second receiving module, which is configured to receive the device identification sent from the mobile terminal token and the related token serial number;

a second determining module, which is configured to determine whether the token serial number received by the second receiving module is stored in the cache, if yes, update a device identification which is related to a currently cached token serial number with the device identification received by the second receiving module; otherwise, store the device identification received by the second receiving module and the related token serial number into the cache; and a pushing module, which is configured to receive a pushing request, select the mobile terminal token according to the currently cached device identification and the related token serial number, and send a pushing massage to the mobile terminal token.

According to the present invention, it realize a password authentication between a client, a server and a mobile device token via a manner of pushing, it can speed up the data transmission in the traditional authentication, and the invention applies a challenge-response mode in inputting a password instead of inputting by a user, which prevent the process from being attacked, thus, the process of authentication is more secure and more accurate.

BRIEF DESCRIPTION OF ACCOMPANY DRAWINGS

The technical solutions in the embodiments of the present invention will be further described more clearly and completely with the drawings of the present invention. Apparently, the drawings described herein are just for a few embodiments of the present invention. On the basis of the drawings, other possible drawings can be made by those skilled in the art without any inventive work.

Figures 1, 2:
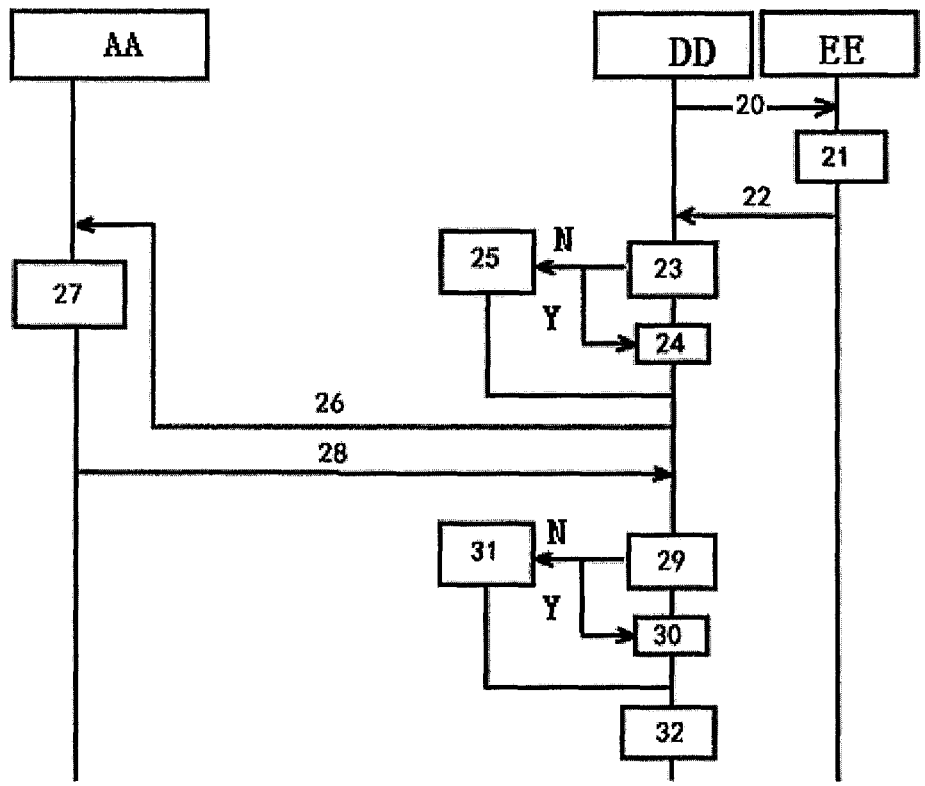
Figure 6:
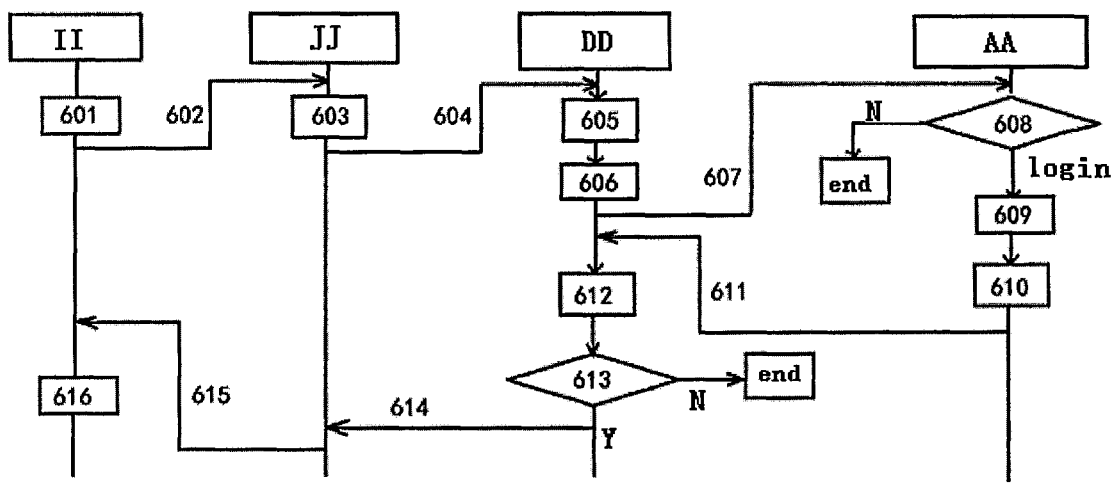
Figure 7:
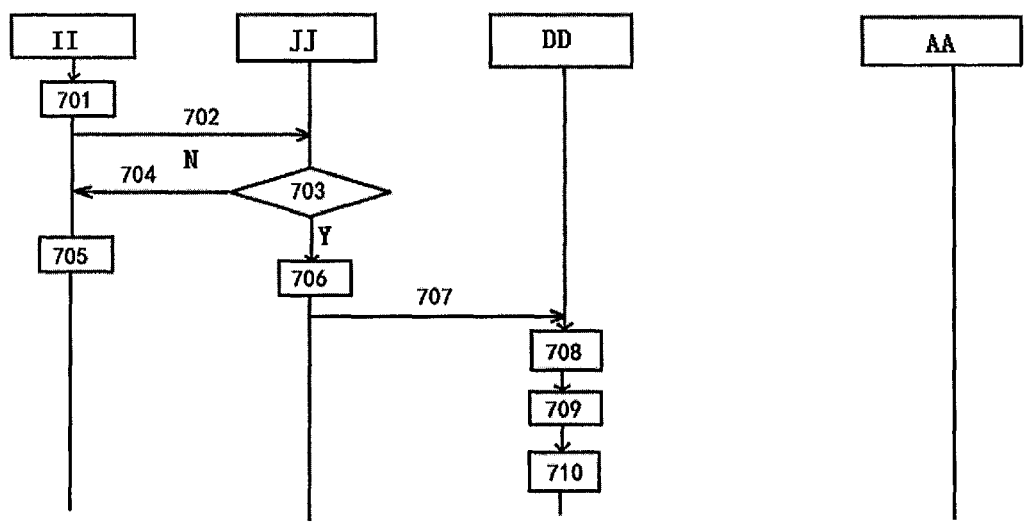
Figure 8:
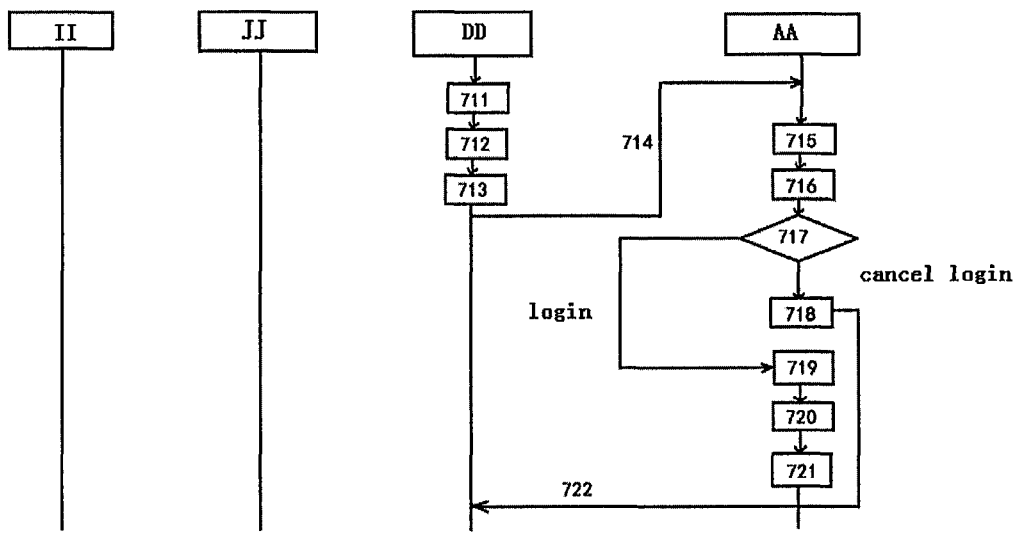
Figure 9:
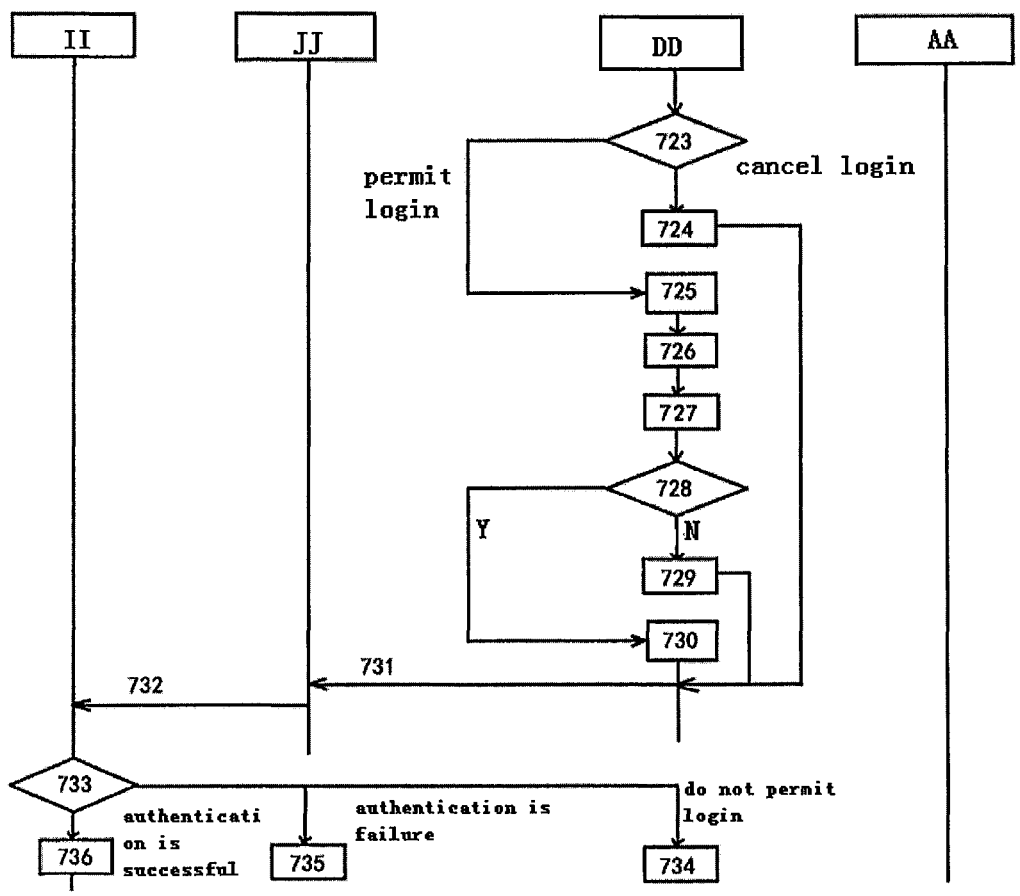
Figure 10:
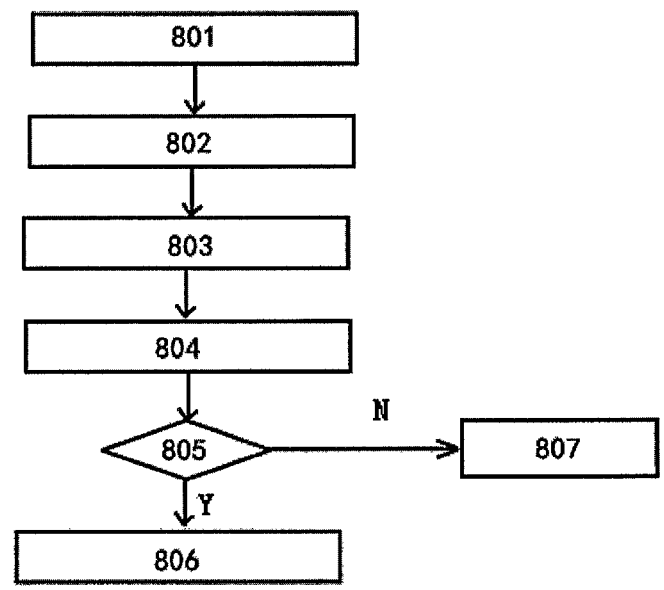
Figure 11:
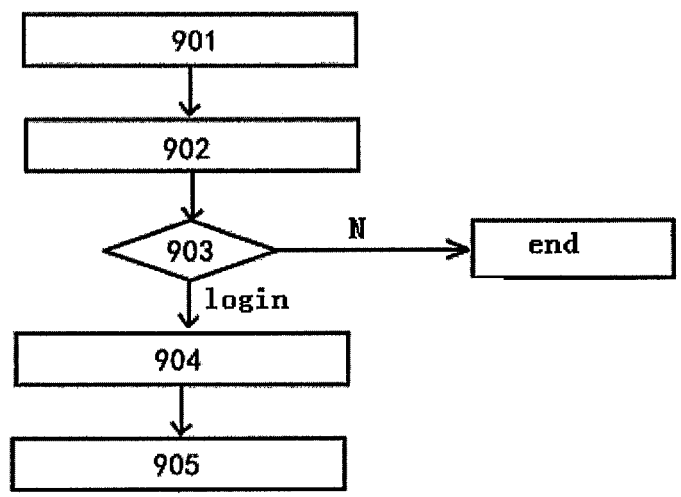

FIG. 1-2 and FIG. 1-2 provide a flow diagram of a method for realizing pushing according to Embodiment 1 of the present invention;

FIG. 2 provides a flow diagram of an application context for pushing a message to a mobile terminal token accurately according to Embodiment 1 of the present invention;

FIG. 3 provides a flow diagram of a method for realizing pushing according to Embodiment 2 of the present invention;

FIG. 4 provides a block diagram of a device for realizing pushing according to Embodiment 3 of the present invention;

FIG. 5 provides a block diagram of a mobile terminal token according to Embodiment 4 of the present invention;

FIG. 6 provides a flow diagram of a working method of a pushing authentication system according to Embodiment 5 of the present invention;

FIG. 7, FIG. 8 and FIG. 9 provide a flow diagram of a working method of a pushing authentication system according to Embodiment 6 of the present invention;

FIG. 10 provides a flow diagram of a working method of an authentication server in a pushing authentication system according to Embodiment 7 of the present invention; and FIG. 11 provides a flow diagram of a working method of a mobile terminal token in a pushing authentication system according to Embodiment 8 of the present invention.

DETAILED DESCRIPTION OF THE INVENTION

The technical solutions in the embodiments of the present invention are further described more clearly and completely with the drawings of the present invention. Apparently, Embodiments described herein are just a few Embodiments of the present invention. On the basis of Embodiments of the invention, all other related Embodiments made by those skilled in the art without any invention work belong to the scope of the invention.

The present invention applies to a system including an authentication server, an authentication database, an operation system server, a client, and a mobile terminal, in which, the mobile terminal specifically is a terminal device, such as a cellphone, which is equipped with a mobile terminal token, the client may specifically be a PC; in the present invention, a pushing authentication system includes an application interface, an application server, an authentication server and a mobile terminal token, and a pushing authentication device includes an authentication server and a mobile terminal token.

In the present invention, in the process that the mobile terminal token is triggered by the authentication server, a network data link between the authentication server and the mobile terminal token is built, and a corresponding relation between user information and the network data link is stored in the authentication server, an access address is stored inside when the mobile terminal token is started, and the authentication server is accessed according to the access address, and a network data link between the mobile terminal token and the authentication server, which is preferably a network data link suitable for a TCP protocol, is rebuilt, and then the mobile terminal token sends token information to the authentication server via the network data link, and the authentication server obtains the token information correspondingly stored in a storage area of the server, and the stored token information is updated as the received token information in the case that the received token information is different from the stored token information;

in which, the token information includes: a token serial number, a token identification code and a mobile terminal operation system;

for instance, the access address stored in the mobile terminal token is api-dfserv.cloudentify.com: 1843;

The token information sent by the mobile terminal token to the authentication server is {"tokens":["1000000006", "1000000003"],"os":"1",udid":"57987117827971672588" "reqtype":"1"}.

Embodiment 1

The Embodiment 1 of the present invention provides a method for realizing pushing, which applies to a system including a mobile terminal, a client, an operation system server, an authentication server, and an authentication database, in which, the mobile terminal is equipped with a mobile terminal token, such as a cellphone token; as shown in FIG. 1-1 and FIG. 1-2, when a mobile terminal token is triggered by a user in a website of the client, the method includes:

Step 1) the client sends an obtaining-trigger-two-dimension-code request to the operation system server;

Step 2) the operation system server receives the obtaining-trigger-two-dimension-code request, and obtains a user ID from the obtaining-trigger-two-dimension-code request, and generates a triggering request according to the user ID;

Step 3) the operation system server sends the triggering request to the authentication server;

Step 4) the authentication server receives the triggering request, and generates a request identification, and obtains the user ID from the triggering request, binds the request identification with the user ID and stores them into a cache;

specifically, a random digit is generated by invoking a random-digit-generated function, the random digit is made as the request identification (reqid).

for instance, the generated request identification reqid=fasdcvxvdsafdsfzcxcsdfsdafcxz.

Step 5) the authentication server sends a inquire information including the user ID to the authentication database;

Step 6) the authentication database receives the inquire information, obtains the user ID from the inquire information, and inquires the user information according to the user I;

Step 7) the authentication database returns the inquired user information to the authentication server;

Step 8) the authentication server receives the user information, and generates a triggering-request response according to the user information and the request identification;

specifically, the user information includes an address of the authentication server.

Step 9) the authentication server returns the triggering-request response to the operation system server;

Step 10) the operation system server receives the triggering-request response, and generates a triggering two-dimension code according to the triggering-request response;

specifically, the operation system server obtains the request identification and the address of the authentication server in the user information from the triggering-request response, and then invoke a two-dimension-code-picture-generate function to transfer the obtained data into a triggering two-dimension code which is in the form of two-dimension code picture.

For instance, the data, which is composed according to the request identification and the address of the authentication server, is yunxin://api-dfserv.cloudentify.com?reqid=fasdcvxvdsafdsfzexcsdfsdaf cxz;

and then, the two-dimension-code-picture-generate function is invoked to transfer the data into the triggering two-dimension code.

Step 11) the operation system server sends the triggering two-dimension code to the client;

specifically, the operation system server finds out a corresponding email box according to the user ID included in the user information, and send the triggering two-dimension code to the email box.

Step 12) the client receives the triggering two-dimension code and displays the triggering two-dimension code;

specifically, the client receives the triggering two-dimension code by the user receiving the email, and displays the triggering two-dimension code.

Step 13) the mobile terminal token scans the triggering two-dimension code displayed in the client to obtain the request identification and the address of the authentication server, and builds a TCP link with the authentication server according to the address of the authentication server, and generates an obtaining-triggered-information request according to a device identification and the request identification;

specifically, the device identification is configured to identify a unique mobile terminal. A device identification is generated for a mobile terminal when a mobile terminal token runs in the mobile terminal for the first time. For instance, the device identification of the mobile terminal A is 69235789584751615933.

Step 14) the mobile terminal token sends the obtaining-triggered-information request to the authentication server;

Step 15) the authentication server receives the obtaining-triggered-information request, and obtains the device identification and the request identification from the obtaining-triggered-information request;

Step 16) the authentication server determines whether the obtained request identification exists in the cache, if yes, Step 19 is executed; otherwise, Step 17 is executed;

In the present Embodiment 1, specifically, whether the triggering two-dimension code is valid is determined by determining whether the request identification exists in the cache.

In the present Embodiment 1, preferably, when it comes to the security, a valid time of the triggering two-dimension code for displaying for a user can be set, specifically, it can ensure the validity of the triggering two-dimension code by setting the validity of the request identification. The request identification is stored in the cache after the request identification is generated by the authentication server, and a system time of the server is recorded, and the request identification is deleted from the cache in the case that the interval between a current time and the recorded system time is longer than a preset duration.

Furthermore, Step 16 may include that the request identification is cleared from the cache and Step 19 is executed in the case that the obtained request identification exists in the cache.

Step 17) the authentication server returns information that the triggering two-dimension code is invalid to the mobile terminal token;

Step 18) the mobile terminal token prompts that the process of triggering fails, and the process comes to an end.

Step 19) the authentication server obtains the user ID which is bound with the request identification, and composes a token-inquired information according to the user ID;

Step 20) the authentication server sends the token-inquired information to the authentication database;

Step 21) the authentication database receives the token-inquired information, looks up user token information corresponding to a user ID included in the token-inquired information;

Step 22) the authentication database returns the user token information to the authentication server;

Step 23) the authentication database receives the user token information, and determines whether a current obtained device identification is included in the user token information, if yes, Step 24 is executed; otherwise, Step 25 is executed;

Step 24) the authentication server generates a seed key, and relates the seed key with a token serial number included in the user token information, and composes updated information according to the token serial number and the seed key, and executes Step 26;

Specifically, a random number of ten digits is made as a seed-generated factor by using a random number algorithm, and then the seed key is generated by using a PBKDF2 algorithm.

Preferably, the authentication server encrypts the seed key, and composes the updated information according to the token serial number and the encrypted seed key.

Furthermore, the authentication server executes following steps after the seed key is generated and before Step 26 is executed:

Step 24-1, the authentication server sends the updated information to the authentication database;

Step 24-2, the authentication database receives the updated information, and obtains the token serial number and the seed key from the updated information, and updates a seed key, which relates to the obtained token serial number, in the user token information by using the obtained seed key.

Step 25) the authentication server generates a corresponding token serial number for the device identification, generates a seed key which is related to the generated token serial number, composes storage information according to the device identification, the token serial number and the seed key, and then executes Step 26;

Specifically, that the authentication server generates a corresponding token serial number for the device identification specifically includes: a current largest token serial number is inquired from the server system, 1 is added to the current largest token serial number to get a result, the result is made as a newly generated token serial number. Preferably, the token serial number is displayed as a number of ten digits, for instance, the inquired largest token serial number is 1000000122, thus, the newly generated token serial number is 1000000123.

Furthermore, after the seed key is generated by the authentication server and before Step 26, the process further includes:

Step 25-1, the authentication server sends the storage information to the authentication database;

Step 25-2, the authentication database receives the storage information, and obtains the device identification, the token serial number and the seed key from the storage information, and stores the device identification, the token serial number and the seed key into the user token information.

Step 26) the authentication server composes the triggering information of the token serial number and the seed key, and returns the triggering information to the mobile terminal token;

Preferably, the authentication server can just returns the token serial number to the mobile terminal token.

Step 27) the mobile terminal token receives the triggering information, relates the triggering information to the device identification, and stores them, and builds a persistent connection with the authentication server;

Specifically, that the persistent connection is built with the authentication server includes: the mobile terminal token builds a connection with the authentication sever via TCP (Transmission Control Protocol), and sends a heartbeat package to the authentication server for every five minutes to check whether the connection is normal. The mobile terminal token will try to connect to the authentication server initiatively when the network data link is cut in the process of connection and then the network is recovered, and Step 28 is executed when the connection is built.

Step 28) the mobile terminal token obtains the token serial number from the triggering information, and sends the device identification and the token serial number related to the device identification to the authentication server via the network data link;

Step 29) the authentication server receives the device identification and the related token serial number via the network data link, and determines whether the token serial number is in the cache, if yes, Step 30 is executed; otherwise, Step 31 is executed;

Step 30) the authentication server updates a device identification corresponding to the cached token serial number by using the received device identification, and executes Step 32;

Step 31) the authentication server stores the received device identification and the related token serial number into the cache, and executes Step 32;

Step 32) the authentication server clears the device identification and the related token serial number in the cache when the network data link is disconnected.

As shown in FIG. 2, after the process, provided by the Embodiment 1 as shown in FIG. 1-1 and in FIG. 1-2, is realized, it provides a flow diagram of an application context for pushing a message to a mobile terminal token accurately, which includes:

Step 101, the client receives a user login request, and obtains a user ID and a login password from the user login request;

Step 102, the client sends the user ID and the login password to the operation system server;

Step 103, the operation system server receives the user ID and the login password, and verifies the user ID, executes Step 104 in the case that the user ID is verified unsuccessfully; executes Step 106 in the case that the user ID is verified successfully;

Step 104, the operation system server returns information that the user ID is wrong to the client;

Step 105, the client displays error information, the process comes to an end.

Step 106, the operation system server sends the user ID to the authentication server;

Step 107, the authentication server obtains a token serial number corresponding to the user ID and a device identification from the authentication database;

Step 108, the authentication server determines whether the token serial number and the device identification exist in the cache, if yes, executes Step 112; otherwise, executes Step 109;

Step 109, the authentication server returns error information that no terminal receives the pushing information;

Step 110, the operation system server returns the error information that on terminal receives the pushing information;

Step 111, the client displays error information, and the process comes to an end;

Step 112, the authentication server finds a corresponding mobile terminal token according to the token serial number and the device identification;

Step 113, the authentication server pushes authentication information to the mobile terminal token via the network data link; and Step 114, the mobile terminal token receives the authentication information and displays the information, and waits for a choice from the user.

Embodiment 2

The present Embodiment 2 provides a flow diagram of a method for realizing pushing, specifically, the work flow of the authentication server in Embodiment 1 is made as an example, as shown in FIG. 3, the work flow includes the following steps:

Step 201, the authentication sever receives the triggering request from the operation system server, generates a request identification, and obtains the user ID from the triggering request, and binds the request identification with the user ID and stores them into the cache, the authentication server obtains user information from the authentication server according to the user ID, and generates a triggering request response according to the user information and the request identification, and sends to the operation system server;

furthermore, Step 201 can be instituted with: the authentication server receives an obtaining-trigger-two-dimension-code request from the client, obtains the user ID from the obtaining-trigger-two-dimension-code request, and generates the request identification, and binds the request identification with the user ID and stores them into the cache, obtains the user information from the authentication server according to the user ID, and generates a triggering two-dimension code according to the user information and the request identification and returns the triggering two-dimension code to the client.

Step 202, the authentication server receives an obtaining-triggering-information request sent from the mobile terminal token, and obtains a device identification and the request identification from the obtaining-triggering-information request;

Step 203, the authentication server determines whether the obtained request identification is stored in the cache, if yes, executes Step 205; otherwise, executes Step 204;

Step 204, the authentication server returns information that the triggering two-dimension code is invalid, and the process comes to an end.

Step 205, the authentication server obtains the user ID which is bound with the request identification, and composes a token inquiring information according to the user ID and sends the token inquiring information to the authentication database, and obtains the user token information returned from the authentication database;

Step 206, the authentication server determines whether the currently obtained device identification exists in the user token information, if yes, executes Step 208; otherwise, executes Step 207;

Step 207, the authentication server generates a corresponding token serial number for the device identification, and generates a seed key and relates the seed key with the token serial number, and then executes Step 209;

Step 208, the authentication server generates a seed key, and relates the seed key with the token serial number, which is in the user token information, corresponding to the device identification, and then executes Step 209;

Step 209, the authentication server compose the token serial number and the seed key into the triggering information and returns the triggering information to the mobile terminal token;

Preferably, the authentication server can just returns the token serial number to the mobile terminal token.

Furthermore, after the Step 209, the process includes: the authentication server stores the device identification and the related triggering information into the cache when the authentication server receives the device identification and the related triggering information, which are sent from the mobile terminal token via the network data link; when the network data link disconnects, the device identification and the related triggering information are cleared.

Embodiment 3

It provides a device for realizing pushing in the present Embodiment 3, as shown in FIG. 4, which includes:

a first receiving and sending module 101, which is configured to receive a triggering request sent from an operation system server, to obtain a user ID from the triggering request, to generate a request identification, to bind the request identification with the user ID and store them into the cache, to obtain user information from an authentication database according to the user ID, and to generate a triggering-request response according to the user information and the request identification and return the triggering-request response to the operation system server;

a first receiving module 102, which is configured to receive an obtaining-trigger-information request sent from the mobile terminal token, and to obtain the device identification and the request identification from the obtaining-trigger-information request;

a first determining module 103, which is configured to determine whether the request identification obtained by the first receiving module 102 exists in the cache, if yes, obtain the user ID which is bound with the request identification, and obtain user token information from the authentication database according to the user ID, and obtain a token serial number related to the device identification according to the device identification and the user token information which are obtained by the first receiving module 102, and return the token serial number to the mobile terminal token; otherwise, return error information to the mobile terminal token;

furthermore, the first determining module 103 includes an obtaining unit, a determining unit and a generating unit, in which the obtaining unit is configured to compose token-inquiring information according to the user ID and send the token-inquiring information to the authentication database, and receive the user token information, which is found according to the user ID included in the token-inquiring information, returned from the authentication database;

the determining unit specifically is configured to determine whether the device identification obtained by the first receiving module 102 exists in the user token information, if yes, obtain a token serial number related to the device identification from the user token information, and return the token serial number to the mobile terminal token; otherwise, generate a token serial number corresponding to the device identification, and return the generated token serial number to the mobile terminal token; and the generating unit is specifically configured to generate a seed key, and relate the seed key to the token serial number, and compose the seed key and the token serial number into triggering information, and return the triggering information to the mobile terminal token;

preferably, the first determining module 103 further includes a composing unit, which is configured to compose update information according to the token serial number and the seed key and send the update information to the authentication database when the determining unit determines that the result is yes; and the composing unit is configured to compose storage information according to the device identification, the token serial number and the seed key and send the storage information to the authentication database when the determining unit determines the result is no;

a second receiving module 104, which is configured to receive the device identification and the token serial number related to the device identification which are sent from the mobile terminal token;

a second determining module 105, which is configured to determine whether the token serial number obtained by the second receiving module 104 exists in the cache, if yes, update a device identification related to the currently cached token serial number with the device identification received by the second receiving module 104; otherwise, store the device identification and the token serial number related to the device identification, which are received by the second receiving module 104, into the cache;

a pushing module 106, which is configured to receiving a pushing request, and to determine a mobile terminal token according to the currently cached device identification and the token serial number related to the device identification, and to send pushing information to the mobile terminal token.

Furthermore, the pushing module 106 includes an obtaining unit and a determining unit, in which, the obtaining unit is configured to obtain a user ID from the pushing request, and to obtain a token serial number and a device identification, which are corresponding to the user ID, from the authentication database;

the determining unit is configured to determine whether the token serial number and the device identification obtained by the obtaining unit exist in the cache, if yes, find out a corresponding mobile terminal token according to the token serial number and the device identification, and send the pushing information to the mobile terminal token; otherwise, return an error information.

The device provided in the present Embodiment 3 further includes a clearing module and a timing clearing module;

specifically, the clearing module is configured to clear the request identification in the cache in the case that the first determining module 103 determines that the obtained request identification exists in the cache.

The timing clearing module is configured to record a time of the first receiving and sending module 101 generating a request identification, and to clear automatically the request identification in the cache in the case that the duration between the time and current time is a preset duration.

The device provided in the present Embodiment 3 further includes a connecting module and a checking module, in which, the connecting module is configured to built a persistent link with a mobile terminal token; the checking module is configured to check a state of the persistent link, and to clear the currently cached device identification and the token serial number related to the device identification when the persistent link is disconnected.

In the device provided in the present Embodiment 3, the first receiving and sending module 101 is configured to receive an obtaining-trigger-two-dimension-code request sent from a client, and to obtain a user ID from the obtaining-trigger-two-dimension-code request, to generate a request identification, to bind the request identification with the user ID and store them into the cache, and to obtain the user information from the authentication database according to the user ID, and to generate a triggering two-dimension code according to the user information and the request identification and return the triggering two-dimension code to the client.

Embodiment 4

It provides a working method of a mobile terminal token and a mobile terminal toke, as shown in FIG. 5, the mobile terminal device includes:

an obtaining module 201, which is configured to obtain a triggering two-dimension code, and to obtain a request identification and an authentication server address from the obtained triggering two-dimension code;

specifically, the obtaining module 201 can obtain the triggering two-dimension code by scanning a triggering two-dimension code picture;

a receiving module 202, which is configured to receive a token serial number sent from the authentication server, and to relate the token serial number with a device identification of the mobile terminal token and store them; and to receiving pushing information sent from the authentication server;

a connection module 203, which is configured to build a connection with the authentication server according to the authentication server address obtained by the obtaining module 201; and is configured to build a persistent link with the authentication server when the determining module 202 receives the token serial number;

a sending module 204, which is configured to generate an obtaining trigger information and send the obtaining trigger information to the authentication server according to the request identification and the device identification of the mobile terminal token, which are obtained by the obtaining module 201, and to send the device identification and the token serial number related to the device identification to the authentication server to the authentication server after the persistent link between the mobile terminal token and the authentication server;

a displaying module 205, which is configured to display the pushing information received by the receiving module 202.

It also provides the working method of the mobile terminal token according to the present Embodiment 4, the method includes:

The mobile terminal token obtains the request identification and the authentication server address from the triggering two-dimension code when the mobile terminal token obtains the triggering two-dimension code, and builds a connection with the authentication server according to the authentication server address, and generates the obtaining-trigger-information request according to the request identification and the device identification and sends the obtaining-trigger-information request to the authentication server;

The mobile terminal token relates the token serial number with the device identification and stores them when the mobile terminal token receives the token serial number sent from the authentication server, and builds the persistent link with the authentication server, and sends the device identification and the token serial number to the authentication server, and displays the pushing information and waits for user's operation when the pushing information is received from the authentication server.

Furthermore, the mobile terminal token stores the seed key when the mobile terminal token receives a seed key which is sent with the token serial number.

Embodiment 5

It provides a wording method of a pushing authentication system according to the present Embodiment 5, which applies to a system including an application interface, an application server, an authentication server and a mobile device token, as shown in FIG. 6, the method includes:

Step 601, the application interface receives user information input by a user; in which, the user information can be a user name or a user name and a password, in the present Embodiment 5, the user information is a user name;

Step 602, the application interface sends the user information to the application server;

Step 603, the application server generates an authentication request according to the user information and an application identification stored inside after the application server receives the user information;

Step 604, the application server sends the authentication request to the authentication server;

Step 605, the authentication server generates a challenge value and stores the challenge value after the authentication request is received by the authentication server, and obtains the user information and the application identification from the authentication request, and obtains corresponding token information and a network data link according to the user information, and obtains a corresponding application name according to the application identification;

Step 606, the authentication server generates a pushing authentication request according to the challenge value, the token information, the user information and the application name;

Step 607, the authentication server pushes the pushing authentication request to a corresponding mobile terminal token a the network data link;

Step 608, the mobile terminal token generates login information according to the user information and displays the login information, and receives a choice from the user, and executes Step 609 when the user determines to login; otherwise, the process comes to an end;

Step 609, the mobile terminal token obtains the challenge value from the pushing authentication request, and calculates on the challenge value and the token seed key stored inside to generate a first response value;

Step 610, the mobile terminal token generates an authorization result which includes the first response value;

Step 611, the mobile terminal token sends the authorization result to the authentication server via the network data link;

Step 612, the authentication server obtains the first response value from the authorization result when the authorization result is received by the authentication server, and obtains a correspondingly stored server seed key and the challenge value, and calculates on the challenge value and the server seed key to obtain a second response value;

Step 613, the authentication server determines whether the first response value matches the second response value, if yes, executes Step 114; otherwise, the process comes to an end;

Step 614, the authentication server returns an authentication result that the authentication is successful to the application server;

Step 615, the application server sends information that the authentication is successful to the application interface after the authentication result is received by the application server;

Step 616, the application interface permits that the user accesses to the application after the information that the authentication is successful is received by the application interface, the process comes to an end.

Embodiment 6

It provides a working method for a pushing authentication system according to the present Embodiment 6, which applies to a system including an application interface, an application server, an authentication server and a mobile terminal token, as shown in FIG. 7, FIG. 8 and FIG. 9, the method includes:

Step 701, the application interface receives user information input by a user, which includes a user name and a password;

in which, the user information can be a user name, can also be a user name and a password, in the present Embodiment 7, the user information includes a user name and a password;

for instance, the user information includes the user name that is abc@test.com and the password that is 168408afag.

Step 702, the application interface sends the user name and the password to the application server;

Step 703, the application server determines whether both of the user name and the password are correct, if yes, executes Step 706; otherwise, executes Step 704;

Step 703 specifically includes: the application server determines whether any user information corresponding to the received user name is obtained from an application server storage area; the application server determines whether a password in the user information is same as the received password in the case that the user information corresponding to the received user name is obtained, if yes, the user name and the password are correct; otherwise, the user name and the password are incorrect and Step 704 is executed; the application server returns a response that the user name is incorrect to the application interface in the case that the user information corresponding to the received user name is not obtained.

Step 704, the application server returns a response that the user information is incorrect to the application interface.

Step 705, the application interface outputs information that the user information is incorrect after the response that the user information is incorrect is received by the application interface, then the process comes to an end;

in the present Embodiment 6, before the Step 705, the method further includes: initialize times of verification; when a response that the user information is incorrect, Step 705 further includes: updates the times of verification, and determines whether the updated times of verification reaches a preset times, if yes, report an error, and the process comes to an end; otherwise, return to Step 701; in which, the initial value of the times of verification is 0; updating the times of verification is preferably adding 1 to the times of verification; the preset times of verification is preferable three times;

furthermore, in the present Embodiment 6, after the application interface outputs the user information is incorrect, the method further includes that outputs information that re-enter user information, and waits for receiving the user information entered by the user, and returns to Step 701;

Step 706, the application server generates an authentication request according to the user name and an application identification stored inside;

furthermore, the Step 706 can also include: the application server encrypts the authentication request with a first preset negotiation key to obtain an authentication request cipher text;

in which, that the application server encrypts the authentication request with the first preset negotiation key specifically includes: the client encrypts the authentication request with a preset encryption algorithm according to the first preset negotiation key; preferably, the preset encryption algorithm is DES algorithm or RSA algorithm;

for instance, the application interface is a WEBSDK login interface, and the corresponding application identification is yiwnzh-ajg;

Step 707, the application server sends the authentication request to the authentication server;

specifically, Step 707 includes: the application server sends the authentication request to an authentication agent, and the authentication agent transfers the authentication request to the authentication server when the authentication request is received by the authentication agent;

Step 707 can also be: the application server sends the authentication request cipher text to the authentication agent, the authentication agent transfers the authentication request cipher text to the authentication server after the authentication request cipher text is received by the authentication agent.

Step 708, the authentication server obtains the user name and the application identification from the request authentication after the authentication request is received by the authentication server;

Step 708 can also be: the authentication server decodes the authentication request cipher text according to the first preset negotiation key when the authentication request cipher text is received by the authentication server to obtain the authentication request, and obtains the user name and the application identification from the authentication request;

in which, that decoding the authentication request cipher text according to the first preset negotiation key specifically is the authentication decodes the authentication request cipher text via a preset decryption algorithm according to the first preset negotiation key; preferably, the preset decryption algorithm is DES algorithm or RSA algorithm, etc.

Step 709, the authentication server obtains corresponding token information and a network data link from the server storage area according to the user name;

in the present Embodiment 6, after the authentication server obtains the user name from the authentication request, the method further includes: the authentication server determines whether a user record corresponding to the user name can be found from the server storage area, if yes, continues to executes the method; otherwise, returns information that the user has not been registered to the application server;

in the present Embodiment 6, the user record stored in the server storage area includes: the user name, the server seed key, an application name and the token information, in which, the token information includes a token identification code, a token serial number, and a mobile terminal operation system.

Step 710, the authentication server obtains a corresponding application name from the server storage area according to the application identification;

Step 710 further includes: determines whether the application name corresponding to the application identification can be found from the server storage area, if yes, continues to execute following steps; otherwise, returns information that the application is not registered to the application server;

Step 711, the authentication server generates a challenge value of a preset length, and relates to the user information and stores the user information into the server storage area;

preferably, the preset length is decimal data of 6 bits;

in the present Embodiment 6, that the challenge value is generated can be invoking a random number generating function to generate a random number, and making the random number as the challenge value; can also be obtaining the corresponding server seed key from the server storage area according to the user name, and calculating on the server seed key to generate the challenge;

in which, calculating on the server seed key to generate the challenge specifically includes: the server seed key is calculated on via a preset algorithm to generate the decimal challenge value of 6 bits, preferably, the preset algorithm is SM3 algorithm or OATH algorithm, etc;

for instance, the generated challenge value is 308962;

in the present Embodiment 6, Step 709, Step 710 and Step 711 can be executed at the same time, there is no order of priority between them;

Step 712, the authentication server obtains a server time, and generates a pushing authentication request according to the challenge value, the token information, the user information and the application name;

Step 712 can further include: the authentication server encrypts the pushing authentication request via a second preset negotiation key to a pushing authentication request cipher text;

Step 712 can also include the authentication server obtains a token identification code from the server storage area, and encrypts the challenge with the token identification code to obtain a challenge cipher text, and generates the pushing authentication request according to the challenge cipher text, the token information, the user information and the application name;

in which, that encrypting the pushing authentication request via the second preset negotiation key specifically includes: the authentication request is encrypted via the preset encryption algorithm according to the second preset negotiation key; preferably, the preset encryption algorithm is DES algorithm or RSA algorithm, etc;

before Step 712, the method further includes: the authentication server invokes the random number generating function to generate a first random number, and makes the first random number as an authentication request ID, and builds a relation with the user information and stores the user information into the server storage area;

furthermore, the method includes: the authentication server obtains a current server time, and makes the current server time as a generating time of the authentication request ID and stores the time into the server storage area;

for instance, the authentication request ID generated by the authentication server is 02c0e8b4-be19-49f6-aab6-273b38522cea;

the generating time of the authentication request ID is 1419325026;

thus, that the pushing authentication request is generated according to the challenge value, the token information, the user information and the application name specifically is that the pushing authentication request is generated according to the challenge value, the token information, the user information and the application name and the authentication request ID;

for instance, the generated pushing authentication request is {"appname":"WEBSDK","challenge":"308962","push-type":"1","reqid":"02c0e8b4-be19-49f6-aa b6-273b38522cea","time":"1419325027","token": "1000000003","userid":"abc@test.com"}; the pushing authentication request cipher text obtained by being encrypted is {"data": "a539f8d217b3c05cb5a5340c7b8c8842bcfcace3180c6da9f 595015a087c1612e39110fc2e 75debc3e435e974a2d7907fa50df880b26ce9ecf1ed4988c9b 1c5ad3d00d4942efcd06f83df5624b3 5769c00f770fd2bb4ada37e0b9c1ac74513ef1e83fc519cb88 a66651a875e7423ed4ff7aa546c07bc9 6251683d617ec8cf03f007f3287352646ee92edcfd08dced63 cd916018ea7596a3b2ccd44f958a6e2 245a6dc863230d1940333430703a798eef", "mac": "3531e1c344107efd1bee06dac2c15f9f71467a3f"}.

Step 713, the authentication server looks up a corresponding mobile terminal token according to the token serial number in the token information;

specifically, the authentication server obtains a corresponding token serial number according to the user name, and obtains a corresponding network data link according to the token serial number, and looks up the corresponding mobile terminal token according to the network data link.

Step 714, the authentication server pushes the pushing authentication request to the mobile terminal token via the network data link;

Step 714 can also be: the authentication server pushes the authentication request cipher text to the mobile terminal token via the network data link.

Step 715, the mobile terminal token obtains the user name and the application name from the pushing authentication request after the pushing authentication request is received by the mobile terminal token, and obtains a current token time;

Before the Step 715, the method further includes: the mobile terminal token decrypts the pushing authentication request cipher text by using the second preset negotiation key after the pushing authentication cipher text is received by the mobile terminal token, so as to obtain the pushing authentication request;

specifically, that the pushing authentication request cipher text is decrypted by using the second preset negotiation key specifically includes: the authentication server decrypts the pushing authentication request cipher text by using a preset decryption algorithm according to the second preset negotiation key; preferably, the preset decryption algorithm is DES algorithm or RSA algorithm, etc.

Step 716, the mobile terminal token fills a preset format according to the user information, the application name and the token current time so as to obtain login information;

in the present Embodiment 6, the preset format is:
Dear XXX(the user name)
Your account login XXX (the application name) at XXX (the current token time),
Please make sure the operation is done by yourself, otherwise, please refuse the operation
YES N Step 717, the mobile terminal token displays the login information, and receives the the choice for the login information from the user, Step 719 is executed in the case that the choice is YES; Step 718 is executed in the case that the choice is NO;

for instance, the login information displayed by the mobile terminal token is
Dear abc@test.com
Your account logs in WEBSDK at 10:50:35 on Dec. 25, 2014
Please make sure the operation is done by yourself, otherwise, please refuse the operation
YES NO Step 717 further includes: a time-over response is returned to the authentication server in the case that the choice from the user is not received, and the authentication server sends the time-over response to the application server which sends the time-over response to the application interface, and then the application interface displays information of time over, and ends;

Step 718, the mobile device token generates an authorization result that canceling to login according to the token serial number, and executes Step 722;

specifically, that the authorization result of canceling to login is generated specifically includes: the mobile terminal token generates the authorization result of canceling to login according to the authentication request ID which is in the pushing authentication request;

Step 718 can further include: the mobile terminal token decrypts the authorization result by using the second preset negotiation key to obtain an authorization result cipher text;

for instance, the authorization result of canceling to login is generated by the mobile device token is {"pushtype":"2", "result":"0","token":"1000000003"};

the authorization result cipher text obtained by encrypting is {"data": "bbd573bc30068b8bfa51e96adcb76ca827d417655ada441b 2e4374cd2cd8a0ccda83da9ab e1978133065b04022464cdbc300d6cafcaccfa513bb9daaff1 d3c3d","mac":"91d8dc0da255e7fcbbc 7e6f435078eb6d275f7f2"};

Step 719, the mobile terminal token obtains the challenge value and a server time from the pushing authentication request, and obtains the token seed key according to the token serial number;

in the present Embodiment 6, that obtaining the challenge value from the pushing authentication request can also be: the mobile terminal token obtains a challenge value cipher text from the pushing authentication request, and obtains a token identification code from the token, encrypts the challenge value cipher text by using the token identification code so as to obtain the challenge value;

Step 720, the mobile terminal token calculates on the challenge value, the server time and the token seed key to generate a first response value by using a preset password generate algorithm;

preferably, in the present Embodiment 6, the mobile terminal token generates the first response value of a preset length, and the present length is preferably the decimal data of six bits;

specifically, the mobile terminal token calculates on the challenge value, the server time, the token seed key and a dynamic factor to generate the first response value by using the preset password generate algorithm;

for instance, the first response value generated by the mobile terminal token is 677165.

Step 721, the mobile terminal generates an authorization result of permitting to login according to the first response value and the token information, and Step 722 is executed;

Step 721 can also include: the mobile terminal token decrypts the authorization result by using the second negotiation key so as to obtain the authorization result cipher text;

specifically, that generating the authorization result of permitting to login according to the first response value and the token information specifically includes: the authorization result of permitting to login is generated according to the first response value, the token information and the authentication request ID;

for instance, the authorization result of permitting to login generated by the mobile terminal token is {"result":"1", "time": "1419325027","reqtype":"2","otp":"677165","token": "1000000003", "reqid":"02c0e8b4-be19-49f6-aab6-273b38522cea"};

The authorization result cipher text obtained by encrypting is {"data": "4fbd9ef79abbb78b5967b4364b93db26527dc3a4c0b5dcad d34428de3649fc0f4e07a7f42 82b5b88c21500f1b4c8bed324ec80f3815264787ea90a4723 e024fb3a4e6cb0967b44f801c9cc64cd 50334fc8f037206d706dfc40727d08a3f67d91174db8396b7 574fa1fbc09da25d861d9b945f3c7dc9 654455ef0e168eb826f8b8e56a928e274f033079bdfb336848 b78","app_version":"2.6","mac": "ba7ab1a123c930ca73ad5944d4fd0cf8ee4f0667"};

in the present Embodiment 6, the mobile terminal token updates an event dynamic factor after Step 721 is executed in the case that the dynamic factor includes the event dynamic factor in Step 720; preferably, updating the event dynamic factor is adding 1 to the event dynamic factor, and an initial value of a time dynamic factor is 0.

Step 722, the mobile terminal token sends the authorization result to the authentication server via the network data link;

Step 722 can also include: the mobile terminal token sends the authorization result to the authentication server via the network data link.

Step 723, the authentication server determines the authorization result after the authorization result is received, Step 725 is executed in the case that the authorization result is permitting to login; Step 724 is executed in the case that the authorization result is canceling to login;

in the present Embodiment 6, the authorization result is permitting to login in the case that the returned result is 1; the authorization result is canceling to login in the case that the returned result is 0;

Before the Step 723, the method can also include: the authentication server decrypts the authorization result cipher text by using the second preset negotiation key after the authorization result cipher text is received by the authentication server so as to obtain the authorization result;

specifically, before the Step 723, the method further includes: the authentication server obtains the authentication request ID from the authorization result, and determines whether the authentication request ID is correct and valid, if yes, Step 723 is executed; otherwise, the authentication request ID stored in the server storage area is deleted, and a failure response is returned to the application server, and the process comes to an end;

in which, that determining whether the authentication request ID is correct and valid specifically includes: the authentication server obtains the current server time, and obtains the authentication request ID and a generating time of the authentication request ID from the server storage area, and determines whether the authentication request ID in the authorization result is same as the authentication request ID obtained from the server storage area, if yes, the authentication request ID is correct; otherwise, the authentication request ID is incorrect; determines whether a difference between the current server time and the generating time of the authentication request ID is in a preset duration, if yes, the authentication request ID is valid; otherwise, the authentication request ID is invalid; preferably, in the case that the authentication request ID is incorrect or invalid, the method further includes: the authentication request ID and the generating time of the authentication request ID stored in the server storage area are deleted;

Step 724, the authentication serve generates an authentication result that login is not permitted, and Step 731 is executed;

Step 724 can also include: the authentication server encrypts the authentication result by using the first preset negotiation key so as to obtain an authentication result cipher text.

Step 725, the authentication server obtains the token information and the first response value from the authorization result;

for instance, the token serial number obtained by the authentication server from the authorization result is 1000000003, and the first response value is 677165;

Step 726, the authentication server obtains a corresponding challenge value and a server seed key from the server storage area according to the token information, and obtains a current server time;

for instance, the current server time obtained by the authentication server is 1419325029;

Step 727, the authentication server calculates on the challenge value, the server seed key and the current server time by using the application password generate algorithm so as to obtain a second response value;

specifically, the authentication server calculates on the challenge value, the server seed key, the current server time and the dynamic factor by using the application password generate algorithm so as to obtain the second response value;

for instance, the second response value generated by the authentication server is 677165;

Step 728, the authentication server determines whether the first response value matches the second response value, if yes, Step 730 is executed; otherwise, Step 729 is executed;

Step 729, the authentication server generates an authentication result that the authentication is failure, and Step 731 is executed;

Step 729 can also include: the authentication server encrypts the authentication result by using the first preset negotiation key so as to obtain the authentication result cipher text.

Step 730, the authentication server generates an authentication result that the authentication is successful, and Step 731 is executed;

Step 730 can also include: the authentication server encrypts the authentication result by using the first preset negotiation key as to obtain the authentication result cipher text;

in the present Embodiment 6, if the dynamic factor in Step 727 includes an event dynamic factor, the authentication server updates the event dynamic factor after Step 730; preferably, updating the event dynamic factor is adding 1 to the event dynamic factor, and an initial value of the time dynamic factor is 0.

Step 731, the authentication server sends the authentication result to the application server;

Step 731 can also include: the authentication server sends the authentication result cipher text to the application server;

Step 731 specifically includes: the authentication server sends the authentication result to an authentication agent, and the authentication agent sends the authentication result to the application server after the authentication result is received by the authentication agent.

Step 732, the application server sends the authentication result to the application interface after the authentication result is received by the application server;

Step 732 can also include: the application interface sends the authentication result cipher text to the application interface.

Step 733, the application interface determines the authentication result after the authentication result is received, Step 734 is executed in the case that the authentication result is that login is not permitted; Step 735 is executed in the case that the authentication is failure; and Step 736 is executed in the case that the authentication is successful;

Step 733 can also include: the application interface decrypts the authentication result cipher text by using the first preset negotiation key after the authentication result cipher text is received by the application interface so as to obtain the authentication result;

Step 734, the application interface displays information that login is not permitted, and the application login authentication flow comes to an end;

Step 735, the application interface displays the information that the authentication is failure, and the application login authentication flow comes to an end;

Step 736, the application interface permits the user to access to the application, and displays an interface after the login is successful, and the application login authentication flow comes to an end;

in which, the client can execute a corresponding operation according to an operation request entered by the user so as to finish a user access until the user exits from the login; it needs to be noted that operation after the application login authentication flow ends does not belong to the protect scope of the present invention.

In the present Embodiment 6, Step 701 further includes: the client starts an overtime timer, and checks whether the value of the overtime timer reaches a preset duration, if yes, prompts information that the authentication is overtime, and the application login authentication flow comes to an end.

In the present Embodiment 6, except for the way of transformation in Embodiment 6, the communication data between the application interface and application server are processed by the algorithm which is negotiated by two parties and the key, so do the communication data between the application server and the authentication agent, the communication data between the authentication agent and the authentication server, and the communication data between the authentication server and the mobile terminal token; furthermore, the said communication data can also include a length and a check bit, the receiver determines whether the communication data is correct according to the length and the check bit in the communication data, if yes, goes to an usual operation process; otherwise, inform the sender that the data is incorrect, and the sender re-sends the communication data; furthermore, the communication data can also be transferred via a private software or be encrypted in order to ensure the safety of the communication data between the application server and the interactive interface.

Embodiment 7

It provides a working method of an authentication server in a pushing authentication system according to Embodiment 7 of the present invention, as shown in FIG. 10, the method includes:

Step 801, the authentication server generates a challenge value and stores the challenge value after the authentication server receives an authentication request from an application server, and obtains user information and an application identification from the authentication request;

that generating the challenge value specifically includes: a random number generate function is invoked to generate a random number, and the random number is made as the challenge value;

that generating the challenge value can also include: a corresponding server seed key is obtained according to the user information in the authentication request, and the server seed key is calculated on to generate the challenge value;

Step 802, the authentication server obtains corresponding token information and a network data link according to the user information, and obtains a corresponding application name according to the application identification;

in the present Embodiment 7, that obtaining the corresponding token information and the network data link according to the user information specifically includes: whether the corresponding token information and the network data link can be obtained according to the user information is determined, if yes, the corresponding token information and the network data link are obtained; otherwise, an error response is returned to the application server, the process is ended.

Step 803, the authentication server generates a pushing authentication request according to the challenge value, the token information, the user information and the application name, and pushes the pushing authentication request to a mobile terminal token via the network data link;

if the token information includes a token serial number, that pushing the pushing authentication request to the mobile terminal token specifically includes: a corresponding mobile terminal token is obtained according to the token serial number, and the pushing authentication request is pushed to the mobile terminal token.

if the token information includes a token identification code, that generating the pushing authentication request according to the challenge value, the token information, the user information and the application name specifically includes: the challenge value is encrypted by using the token identification code to obtain a challenge value cipher text, and the pushing authentication request is generated according to the challenge value cipher text, the token information, the user information and the application name.

Step 804, the authentication server receives an authorization result returned from the mobile terminal token, and obtains a first response value from the authorization result, and obtains the stored server seed key and the challenge value, and calculates on the challenge value and the server seed key to obtain a second response value;

in the present Embodiment 7, that calculating on the challenge value and the server seed key to obtain the second response value specifically includes: a current server time is obtained, and the current server time, the challenge value, the server seed key and a dynamic factor are calculated on by using a preset password generating algorithm so as to obtain the second response value.

Step 805, the authentication server determines whether the first response value matches the second response value, if yes, the authentication result that the authentication is successful is returned to the application server, the process is ended; otherwise, the authentication result that the authentication is failure to the application server, and the process is ended;

in the present Embodiment 7, if the dynamic factor includes an event dynamic factor in Step 804, and when the authentication result that the authentication is successful is returned to the application server, Step 805 further includes: the event dynamic factor is updated, which is adding 1 to the event dynamic factor.

Embodiment 8

It provides a working method of a mobile terminal token in a pushing authentication system according to Embodiment 8 of the present invention, as shown in FIG. 11, the method includes:

Step 901, the mobile terminal token receives the pushing authentication request from the authentication server;

Step 902, the mobile terminal token obtains the user information and the application name from the pushing authentication request, and generates login information according to the user information and the application name and displays the login information;

if the token information includes the token identification code and a mobile terminal operation system, before Step 902, the method further includes: the token identification code and the mobile terminal operation system are obtained from the pushing authentication request, and the stored token identification code and mobile terminal operation system are obtained, and whether the token identification code and the mobile terminal operation system obtained from the pushing authentication request is same as the stored token identification code and mobile terminal operation system respectively is determined, if yes, Step 902 is executed; otherwise, a response that the token information is incorrect to the authentication server, and the process is ended;

that generating the log in information according to the user information and the application name specifically includes: a current token time is obtained, a preset format is filled according to the user information, the application name and the current token time so as to obtain the login information;

Step 903, the mobile terminal token receives choice of the login information from the user, executes Step 904 in the case that the user choose to login; otherwise, the process is ended;

Step 904, the mobile terminal token obtains the challenge value from the pushing authentication request, and obtains the stored token seed key, and calculates on the challenge value and the token seed key so as to obtain the first response value;

if the token information includes the token identification code, that obtaining the challenge value from the pushing authentication request specifically includes: the challenge value cipher text is obtained from the pushing authentication request, and the stored token identification code is obtained, and the challenge value cipher text is decrypted by using the token identification code so as to obtain the challenge value;

that the challenge value and the token seed key are calculated on so as to obtain the first response value specifically includes: a server time is obtained from the pushing authentication request, and the challenge value, the server time, the token seed key and the dynamic factor are calculated on through the preset password generating algorithm so as to generate the first response value;

Step 905, the mobile terminal token obtains the token information from the pushing authentication request, and generates an authorization result that permitting to login according to the first response value, and sends the authorization result to the authentication server via the network data link, and the operation of token is ended;

in the case that the dynamic factor includes an event dynamic factor, Step 905 further includes: the event dynamic factor is updated, that is adding 1 to the event dynamic factor.

The method further includes: an access address stored inside is obtained when the mobile terminal token is started, and the authentication server is accessed to according to the access address, and the network data link is built between the mobile terminal token and the authentication server, and the token information is sent to the authentication server via the network data link.

The present invention takes an android mobile phone as an example, beyond that, the authentication server sends the generated pushing authentication request to icloud in the case that the mobile terminal operation system in the token information obtained by the authentication server is an IOS system, icloud sends the pushing authentication request to a corresponding iphone token after icloud receives the pushing authentication request, the iphone token sends authorization information to the authentication server directly after the iphone token processes the pushing authentication request.

the generated pushing authentication request is sent to a wechat server in the case that the token information obtained by the authentication server includes wechat ID, the wechat server sends the pushing authentication request to the mobile phone wechat token after the pushing authentication request is received by the wechat server, and the mobile phone wechat token sends the authorization information to the wechat server after the mobile we chat token processes the pushing authentication request, and the wechat server sends the authorization information to the authentication server after the wechat server receives the authorization information.

The Embodiments described herein are just a few preferable Embodiments of the present invention. On the basis of the Embodiments of the invention, all other related Embodiments made by those skilled in the art without any inventive work belong to the scope of the invention.

Notes in FIG. 1-1

1—sends the obtaining-trigger-two-dimension-code request to the operation system server;

2—receives the obtaining-trigger-two-dimension-code request, and obtains user ID from the request, and generates a triggering request according to the user ID;

3—sends the triggering request to the authentication server;

4—receives the triggering request, generates a request identification, obtains the user ID from the triggering request, and binds the request identification with the user ID and stores them into a cache;

5—sends inquiring information including the user ID to the authentication database;

6—receives the inquiring information, obtains the user ID from the inquiring information, and inquires the user information according to the user ID;

7—returns the inquired user information to the authentication server;

8—receives the user information, generates a triggering request response according to the user information and request identification;

9—returns the triggering request response to the operation system sever;

10—receives the triggering request response, and generates a triggering two-dimension code according to the triggering request response;

11—sends the triggering two-dimension code to the client;

12—receives the triggering two-dimension code and displays the triggering two-dimension code;

13—scans the triggering two-dimension code displayed in the client so as to obtain the request identification and an address of the authentication server from the triggering two-dimension code, builds a TCP link with the authentication server according to the address of the authentication server, and generates the obtaining trigger information request according to the device identification and the request identification;

14—sends the obtaining trigger information request to the authentication server;

15—receives the obtaining trigger information request, and obtains the device identification and the request identification from the obtaining trigger information;

16—determines whether the obtained request identification is in the cache;

17—returns information that the two-dimension code is invalid to the mobile terminal token;

18—prompts that triggering is unsuccessful, the process comes to an end;

19—obtains the user ID which is bound with the request identification, and composes token inquiring information according to the user ID.

Notes in FIG. 1-2

20—sends the token inquiring information to the authentication database;

21—receives the token inquiring information, and finds out user token information according to the user ID included in the token inquiring information;

22—returns the user token information to the authentication server;

23—receives the user token information, and determines whether the currently obtained device identification exists in the user token information;

24—generates a seed key, relates the seed key with a token serial number, and composes updating information according to token serial number and the seed key;

25—generates a token serial number corresponding to the device identification, generates the seed key and relates the seed key to the token serial number, and composes storing information according to device identification, the token serial number and the seed key;

26—returns the triggering information composed of the token serial number and the seed key to the mobile terminal token;

27—receives the triggering information, relates the triggering information with the device identification and stores them, and builds a persistent link with the authentication server;

28—obtains the token serial number from the triggering information, and sends the device identification and the related token serial number to the authentication server via the network data link;

29—receives the device identification and the related token serial number via the network data link, and determines whether the token serial number is in the cache;

30—updates the device identification corresponding to the cached token serial number with the received device identification;

31—stores the received device identification and the related token serial number into the cache;

32—clears the device identification and the related token serial number in the cache when the network data link is disconnected.

Notes in FIG. 2

101—receives a user login request, and obtains the user ID and a login password from the user login request;
102—sends the user ID and the user login password to the operation system server;
103—receives the user ID and the login password, and verifies the user identification;
104—returns information that the user identification is incorrect;
105—displays incorrect information;
106—sends the user ID to the authentication server;
107—obtains the token serial number corresponding to the user ID and the device identification;
108—determines whether the token serial number and the device identification exist in the cache;
109—returns incorrect information that no terminal can be pushed to the operation system server;
110—returns the incorrect information that no terminal can be pushed to the client;
111—displays the incorrect information;
112—finds a corresponding mobile terminal token according to the token serial number and the device identification;
113—pushes an authentication message to the mobile terminal token via the network data link;
114—receives the authentication message and displays the message, and wait for a choice from the user.

Notes in FIG. 3

201—the authentication server receives the triggering request from the operation system server, generates a request identification, obtains the user ID from the triggering request, and binds the request identification with the user ID and stores them into the cache; and the authentication server obtains user information from the authentication database according to the user ID, generates a triggering request response according to the user information and the request identification, and sends the triggering request response to the operation system server;
202—the authentication server receives an obtaining-trigger-information request sent from the mobile terminal token, and obtains the device identification and the request identification from the obtaining-trigger-information;
203—the authentication server determines whether the obtained request identification exists in the cache;
204—the authentication server returns information that the two-dimension is invalid to the mobile terminal token;
205—the authentication server obtains the user ID which is bound with the request identification, composes token inquire information according to the user ID, sends the token inquire information to the authentication server, and obtains the user token information returned from the authentication server;
206—the authentication server determines whether the currently obtained device identification exists in the user token information;
207—the authentication server generates a corresponding token serial number for the device identification, generates a seed key, and relates the seed key with the generated token serial number;
208—the authentication server generates a seed key, and relates the seed key with the token serial number in the user token information, which is corresponding to the device identification;
209—the authentication server composes the token serial number and the seed key into triggering information, and returns the triggering information to the mobile terminal token.

Notes in FIG. 6

601—receives the user information input by the user;
602—sends the user information to the application server;
603—generates the authentication request according to the user information and the application identification stored inside after the user information is received;
604—sends the authentication request to the authentication server;
605—generates a challenge value and stores the challenge value after the authentication request is received, obtains the user information and the application identification from the authentication request, obtains token information corresponding to the user information and the network data link, and obtains an application name according to the application identification;
606—generates a pushing authentication request according to the challenge value, the token information, the user information and the application name;
607—pushes the pushing authentication request to a corresponding mobile terminal token via the network data link;
608—generates login information and displays the information according to the user information and the application name after the pushing authentication request is received, and receives a choice of login information from the user;
609—obtains the challenge value from the pushing authentication request, calculates on the challenge value and the token seed key stored inside to generate a first response value;
610—generates an authorization result including the first response value;
611—sends the authorization result to the authentication server via the network data link;
612—obtains the first response value from the authorization result after the authorization result is received, obtains the correspondingly stored server seed key and the challenge value, and calculates on the challenge value and the server seed key to obtain a second response value;
613—determines whether the first response value matches the second response value;
614—returns an authentication result that the authentication is successful to the application server;
615—sends the information that the authentication is successful to the application interface after the authorization result that the authentication is successful is received;
616—permits the user to access after the information that the authentication is successful is received, the process comes to an end.

Notes in FIG. 7

701—receives the user information input by the user, which includes a user name and a password;
702—sends the user name and the password to the application server;
703—determines whether the received user name and the password are correct;

704—returns a response that the user information is incorrect to the application interface;

705—outputs information that the user information is incorrect after the information is received, and the process comes to an end;

706—generates the authentication request according to the user name and the application identification stored inside;

707—sends the authentication request to the authentication server;

708—obtains the user name and the application identification from the authentication request after the authentication request is received;

709—obtains the token information and the network data link from the server storage area according to the user name;

710—obtains a corresponding application name from the server storage area according to the application identification.

Notes in FIG. 8

711—generates a preset length of challenge value, builds a relation with the user information and stores the relation into the server storage area;

712—obtains server time, and generates the pushing authentication request according to the challenge value, the token information, the user information and the application name;

713—finds out a mobile terminal token according to the token serial number in the token information;

714—pushes the pushing authentication request to the mobile terminal token via the network data link;

715—obtains the user name and the application name from the pushing authentication request after the pushing authentication request is received, and obtains a current time of the token;

716—fills the user information, the application name and the current time of the token into a preset format to obtain login information;

717—displays login information, and receives a choice of login information from the user;

718—generates an authorization result that cancels login according to the token serial number;

719—obtains the challenge value and the server time from the pushing authentication request, and obtains the token seed key according to the token serial number;

720—calculates on the challenge value, the server time and token seed key by using a password generated algorithm so as to generate the first response value;

721—generates an authorization result that permit login according to the first response value and the token information;

722—sends the authorization result to the authentication server via the network data link.

Notes in FIG. 9:

723—determines the authorization result after the authorization result is received;

724—generates the authorization result that login is not permitted;

725—obtains the token information and the first response value from the authorization result;

726—obtains the corresponding challenge value and server seed key from the server storage area according to the token information, and obtains the current server time;

727—calculates on the challenge value, the server seed key and the current server time by using the password generated algorithm so as to obtain the second response value;

728—determines whether the first response value matches the second response value;

729—generates the authorization result that the authentication is failure;

730—generates the authorization result that the authentication is successful;

731—sends the authorization result to the application server;

732—sends the authorization result to the application interface after the authorization result is received;

733—determines the authorization result after the authorization result is received;

734—displays the prompt information that the login is not permitted, and the process of application login authentication comes to an end;

735—displays the prompt information that the authentication is failure, and the process of application login authentication comes to an end;

736—permits the user to access the application, and displays an interface after the application is accessed successfully, and the process of application login authentication comes to an end.

Notes in FIG. 10

801—the authentication server generates the challenge value and stores the challenge value after the authentication request is received by the authentication server from the application server, and obtains the user information and the application identification from the authentication request;

802—the authentication server obtains the token information and the network data link according to the user information, and obtains the corresponding application name according to the application identification;

803—the authentication server generates the pushing authentication request according to the challenge value, the token information, the user information and the application name, and pushes the pushing authentication request to the mobile terminal token via the network data link;

804—the authentication server receives the authorization result returned from the mobile terminal token, obtains the first response value from the authorization result, and obtains the server seed key and the challenge value which are stored, and calculates on the challenge value and server seed key to obtain the second response value;

805—the authentication server determines whether the first response value matches the second response value;

806—returns the authorization result that the authentication is successful to the application server, and the process comes to an end;

807—returns the authorization result that the authentication is unsuccessful to the application server, and the process comes to an end.

Notes in FIG. 11

901—the mobile terminal token receives the pushing authentication request sent from the authentication server;

902—the mobile terminal token obtains the user information and the application name from the pushing authentication request, and generates the login information and displays the information according to the user information and the application name;

903—the mobile terminal token receives the choice of login information from the user;

904—the mobile terminal token obtains the challenge value from the pushing authentication request, obtains the stored token seed key, and calculates on the challenge value and the token seed key to generate the first response value;

905—the mobile terminal token obtains the token information from the pushing authentication request, generates the authorization result that login is permitted according to the first response value, sends the authorization result to the authentication server via the network data link, and the operation of the token comes to an end.

The invention claimed is:

1. A working method of directly pushing an authentication system via network data link internally, which applies to a system including an application interface, an application server, an authentication server and a mobile terminal token, in which the mobile terminal token is a mobile device token which is a client software of a mobile device configured to generate a dynamic password and realize a preset encryption algorithm via a program running in the mobile device itself, wherein the method comprises the following steps:

S1) receiving, by the application interface, user information input by a user, and sending the user information to the application server;

S2) generating, by the application server, an authentication request according to the user information and an application identification stored inside after the user information is received by the application server, and sending the authentication request to the authentication server;

S3) generating, by the authentication server, a challenge value and storing the challenge value after the authentication request is received by the authentication server, obtaining the user information and the application identification from the authentication request, obtaining corresponding token information and network data link according to the user information, and obtaining a corresponding application name according to the application identification;

S4) generating, by the authentication server, a pushing authentication request according to the challenge value, the token information, the user information and the application name, and pushing the pushing authentication request to a corresponding mobile terminal token via the network data link;

S5) generating, by the mobile terminal token, login information and displaying the login information according to the user information and the application name, which are in the pushing authentication request after the pushing authentication request is received by the mobile terminal token, receiving a choice for the login information from the user, and executing Step S6 in the case that the choice is to login; otherwise, ending the process;

S6) obtaining, by the mobile terminal token, the challenge value from the pushing authentication request, and calculating the challenge value and the token seed key stored inside so as to generate a first response value;

S7) generating, by the mobile terminal token, an authorization result including the first response value, and sending the authorization result to the authentication server via the network data link;

S8) obtaining, by the authentication server, the first response value from the authorization result after the authorization result is receive by the authentication server, obtaining the server seed key and the challenge value which are correspondingly stored, and calculating the challenge value and the server seed key so as to obtain a second response value;

S9) determining, by the authentication server, whether the first response value matches the second response value, if yes, returning an authentication result that the authentication is successful to the application server and executing Step S10;

otherwise, ending the process;

S10) sending, by the application server, information that the authentication is successful to the application interface after the authentication result is received by the application server; and S11) permitting, by the application interface, the user to access to the application after the application interface receives the information that the authentication is successful, then ending the process, whereby in the process that the mobile terminal token is triggered by the authentication server, a network data link between the authentication server and the mobile terminal token is built, and a corresponding relation between user information and the network data link is stored in the authentication server, an access address is stored inside when the mobile terminal token is started, and the authentication server is accessed according to the access address, and a network data link between the mobile terminal token and the authentication server, which is a network data link suitable for a TCP protocol, is rebuilt, and then the mobile terminal token sends token information to the authentication server via the network data link, and the authentication server obtains the token information correspondingly stored in a storage area of the server, and the stored token information is updated as the received token information in the case that the received token information is different from the stored token information.

2. The method as claimed in claim 1, wherein the token information comprises a token identification code and a mobile terminal operation system;

in Step S5, after the pushing authentication request is received by the mobile terminal token, the Step S5 further comprises:

obtaining, by the mobile terminal token, the token identification code and the mobile terminal operation system from the pushing authentication request, and determining whether the token identification code and the mobile terminal operation system in the pushing authentication request are just the same as the token identification code and the mobile terminal operation system stored inside respectively, if yes, going on executing the step; otherwise, returning information that the token information is incorrect to the authentication server, and ending the step.

3. The method as claimed in claim 1, wherein generating the pushing authentication request according to the challenge value, the token information, the user information and the application name in Step S4 specifically comprises: obtaining, by the authentication server, a server time, and generating the pushing authentication request according to the server time, the challenge value, the token information, the user information and the application name.

4. The method as claimed in claim 3, wherein calculating the challenge value and the token seed key stored inside so as to generate the first response value in Step S6 specifically comprises: obtaining, by the mobile terminal token, the server time from the pushing authentication request, and calculating the challenge value, the server time, the token seed key stored inside and a dynamic factor by using a preset password generating algorithm so as to generate the first response value.

5. The method as claimed in claim 1, wherein calculating the challenge value and the server seed key so as to obtain the second response value in Step S7 specifically comprises: obtaining, by the authentication server, a current server time, and calculating the current server time, the challenge value, the server seed key and the dynamic factor by using the preset password generating algorithm to obtain the second response value.

6. The method as claimed in claim 1, wherein ending the process in Step S5 specifically comprises:
  returning, by the mobile terminal token, an authorization result on canceling the login to the authentication server in the case that a choice that canceling the login is received by the mobile terminal token from the user; returning, by the authentication server, an authentication result on canceling the login to the client after the authentication server receives the authorization result on canceling the login; and displaying, by the client, information that login is not permitted and ending the process after the client receives the authentication result on canceling the login;
  returning, by the mobile terminal token, an authorization result of overtime to the authentication server in the case that a choice is not received from the user in a preset duration; returning, by the authentication server, an authentication result of overtime to the client after the authentication result of overtime is received by the authentication server, and displaying, by the client, information of overtime and the ending process after the authentication result of overtime is received by the client.

7. The method as claimed in claim 1, wherein
  generating the pushing authentication request according to the challenge value, the token information, the user information and the application name in Step S4 specifically comprises: generating, by the authentication server, an authentication request ID, building a relationship with the user information and storing it, and generating the pushing authentication request according to the challenge value, the user information, and the authentication request ID;
  generating the authorization result including the first response value and the token information in Step S7 specifically comprises: generating the authorization result which includes the first response value, the token information and the authentication request ID;
  before Step S8, the method further comprises: obtaining, by the authentication server, the authentication request ID from the authorization result, obtaining the stored authentication request ID, and determining whether the authentication request ID in the authorization result is just the same as the stored authentication request ID, if yes, executing Step S8; otherwise, deleting the stored authentication request ID, and ending the process.

8. The method as claimed in claim 7, wherein
  Step S4 further comprises: obtaining, by the authentication server, the current server time, and making the current server time as an authentication request ID generating time and storing the authentication request ID generating time;
  before Step S8, the method further comprises: obtaining, by the authentication server, the stored authentication request ID generating time and obtaining the server time when the authorization result is received, and determining whether a difference between the server time and the authentication request ID generating time is in a preset duration, if yes, the authentication request ID is valid, and executing Step S8; otherwise, deleting the stored authentication request ID, and ending the process.

9. The method as claimed in claim 1, wherein
  generating the authorization result which includes the first response value in Step S7 specifically comprises: generating, by the mobile terminal token, the authorization result which includes the first response value and the token information;
  obtaining the first response value from the authorization result, and obtaining the server seed key and the challenge which are correspondingly stored in Step S8 specifically comprises: obtaining, by the authentication server, the first response value and the token information from the authorization result, and obtaining the server seed key and the challenge which are stored correspondingly according to the token information.

10. A working method of an authentication server in a system for directly pushing authentication via the network data link internally, in which a mobile terminal token is used as a mobile device token which is a client software of a mobile device configured to generate a dynamic password and realize a preset encryption algorithm via a program running in the mobile device itself, wherein the method comprises the following steps:
  T1) generating, by the authentication server, a challenge value and storing the challenge value after the authentication server receives an authentication request from an application server, and obtaining user information and an application identification from the authentication request;
  T2) obtaining, by the authentication server, corresponding token information and network data link according to the user information, and obtaining a corresponding application name according to the application identification;
  T3) generating, by the authentication server, a pushing authentication request according to the challenge value, the token information, the user information and the application name, and pushing the pushing authentication request to a mobile terminal token via the network data link;
  T4) receiving, by the authentication server, an authorization result returned from the mobile terminal token, obtaining a first response value from the authorization result, obtaining a stored server seed key and the challenge value, and calculating the challenge value and the server seed key so as to obtain a second response value; and
  T5) determining, by the authentication server, whether the first response value matches the second response value, if yes, returning an authentication result that the authentication is successful to the application server, then ending the process;
  otherwise, returning an authentication result that the authentication result is unsuccessful to the application server, then ending the process,
  whereby in the process that the mobile terminal token is triggered by the authentication server, a network data link between the authentication server and the mobile terminal token is built, and a corresponding relation between user information and the network data link is stored in the authentication server, an access address is stored inside when the mobile terminal token is started, and the authentication server is accessed according to the access address, and a network data link between the mobile terminal token and the authentication server, which is a network data link suitable for a TCP protocol, is rebuilt, and then the mobile terminal token sends token information to the authentication server via the network data link, and the authentication server obtains the token information correspondingly stored in a storage area of the server, and the stored token information is updated as the received token information in the case that the received token information is different from the stored token information.

11. The method as claimed in claim 10, wherein after Step T5, the method further comprises the following steps:
   s1) receiving, by the authentication server, an obtaining-trigger-information request sent from the mobile terminal token, and obtaining a device identification and a request identification from the obtaining-triggering-information request;
   s2) determining, by the authentication server, whether the obtained request identification exists in a cache, if yes, obtaining a user ID binding with the request identification, and obtaining user token information from an authentication database according to the user ID, and executing Step s3; otherwise, returning error information to the mobile terminal token, then ending;
   s3) obtaining, by the authentication server, a token serial number which relates to the device identification according to the device identification and the user token information, and returning the token serial number to the mobile terminal token;
   s4) determining, by the authentication server, whether the received token serial number is in the cache after the authentication server receives the device identification which is sent from the mobile terminal token and the related token serial number, if yes, updating a device identification which is related to the cached token serial number with the received device identification, and executing Step s5; otherwise, storing the received device identification and the related token serial number into the cache, and executing Step s5; and
   s5) determining, by the authentication server, a mobile terminal token according to the currently cached device identification and the related token serial number when the authentication server receives a pushing request, and sending pushing information to the mobile terminal token.

12. The method as claimed in claim 11, wherein in Step s2, when the obtained request identification is in the cache, the Step s2 further comprises: deleting, by the authentication server, the request identification in the cache.

13. The method as claimed in claim 11, wherein before Step s1, the method further comprises: receiving, by the authentication server, a triggering request from an operation system server, obtaining user ID from the triggering request to generate a request identification, binding the request identification with the user ID and storing them, obtaining user information from the authentication database according to the user ID, and generating a triggering request response according to the user information and the request identification and returning the triggering request response to the operation system server; or
   receiving, by the authentication server, an obtaining-trigger-two-dimension-code request, obtaining the user ID from the obtaining-trigger-two-dimension-code request to generate the request identification, binding the request identification with the user ID and storing them, obtaining the user information from the authentication database according to the user ID, and generating a triggered two-dimension code according to the user information and the request identification and returning the triggered two-dimension code to the client.

14. The method as claimed in claim 10, wherein the token information comprises a token identification code;
   generating the pushing authentication request according to the challenge value, the token information, the user information and the application name specifically comprises: encrypting, by the authentication server, the challenge value by using the token identification code to obtain a challenge cipher text, and generating the pushing authentication request according to the challenge value cipher text, the token information, the user information and the application name.

15. A working method of a mobile terminal token in a system for directly pushing authentication via network data link internally, in which a mobile terminal token is used as a mobile device token which is a client software of a mobile device configured to generate a dynamic password and realize a preset encryption algorithm via a program running in the mobile device itself, wherein the method comprises the following steps:
   K1) receiving, by the mobile terminal token, a pushing authentication request from an authentication server;
   K2) obtaining, by the mobile terminal token, user information and an application name from the pushing authentication request, and generating login information according to the user information and the application name and displaying the login information;
   K3) receiving, by the mobile terminal token, a choice of login information from the user, and executing the Step K4 in the case that the user chooses to login; otherwise, ending the process;
   K4) obtaining, by the mobile terminal token, a challenge value from the pushing authentication request, and obtaining a stored token seed key, and calculating the challenge value and the token seed key so as to generate a first response value; and
   K5) generating, by the mobile terminal token, an authorization result on permitting to login according to the first response value, sending the authorization result to the authentication server via the network data link, and ending the operation of the token,
   whereby in the process that the mobile terminal token is triggered by the authentication server, a network data link between the authentication server and the mobile terminal token is built, and a corresponding relation between user information and the network data link is stored in the authentication server, an access address is stored inside when the mobile terminal token is started, and the authentication server is accessed according to the access address, and a network data link between the mobile terminal token and the authentication server, which is a network data link suitable for a TCP protocol, is rebuilt, and then the mobile terminal token sends token information to the authentication server via the network data link, and the authentication server obtains the token information correspondingly stored in a storage area of the server, and the stored token information is updated as the received token information in the case that the received token information is different from the stored token information.

16. The method as claimed in claim 15, wherein generating the authorization result on permitting to login according to the first response value specifically comprises: obtaining, by the mobile terminal token, token information from the pushing authentication request, and generating the authorization result on permitting to login according to the first response value and the token information;
the token information comprises a token identification code;
obtaining the challenge value from the pushing authentication request in the Step K4 specifically comprises: obtaining, by the mobile terminal token, a challenge value cipher text from the pushing authentication request, obtaining the stored token identification code, and decrypting the challenge value cipher text by using the token identification code so as to obtain the challenge value.

17. The method as claimed in claim 16, wherein the token information comprises a token identification code and a mobile terminal operation system;
before the Step K2, the method further comprises: obtaining, by the mobile terminal token, a token identification code and a mobile terminal operation system from the pushing authentication request, obtaining the stored token identification code and the mobile terminal operation system, determining whether the token identification code and the mobile terminal operation system in the pushing authentication request are just the same as the stored token identification code and the mobile terminal operation system respectively, if yes, executing the Step K2; otherwise, returning a response that the token information is incorrect to the authentication server, then ending.

18. The method as claimed in claim 15, wherein the method further comprises:
obtaining, by the mobile terminal token, an access address stored inside when the mobile terminal token is started, accessing the authentication server according to the access address, building a network data link between the mobile terminal token and the authentication server, and sending a token characteristic data to the authentication server via the network data link.

19. The method as claimed in claim 15, wherein calculating the challenge value and the token seed key so as to generate the first response value in the Step K4 specifically comprises: obtaining, by the mobile terminal token, a server time from the pushing authentication request, and calculating the challenge value, the server time, the token seed key and a dynamic factor by using a preset password generating algorithm so as to generate the first response value.

20. A device for realizing pushing authentication directly via network data link internally, in which a mobile terminal token is used as a mobile device token which is a client software of a mobile device configured to generate a dynamic password and realize a preset encryption algorithm via a program running in the mobile device itself, wherein the device comprises:
a first receiving and sending module, configured to receive a triggering request from an operation system server, obtain a user identification (ID) from the triggering request, generate a request identification, bind the request identification with the user ID and store them in a cache, obtain user information from authentication database according to the user ID, generate a triggering request response according to the user information and the request identification, and return the triggering request response to the operation system server; or
to receive an obtaining-trigger-two-dimension-code request from the client, obtain the user ID from the obtaining-trigger-two-dimension-code request, generate the request identification, bind the request identification with the user ID and store them in a cache, obtain the user information from the authentication database according to the user ID, generate a triggering two-dimension code according to the user information and the request identification, and return the trigger two-dimension code to the client;
a first receiving module, configured to receive an obtaining-trigger-information request from the mobile terminal token, and obtain a device identification and the request identification from the obtaining trigger information request;
a first determining module, configured to determine whether the request identification obtained by the first receiving module is stored in a cache, if yes, obtain a user ID which is bound with the request identification, obtain user token information from the authentication data base according to the user ID, obtain a token serial number which relates to the device identification according to the device identification obtained by the first receiving module and the user token information, and send the token serial number to the mobile terminal token; otherwise, return error message to the mobile terminal token;
a second receiving module, configured to receive the device identification sent from the mobile terminal token and the related token serial number;
a second determining module, configured to determine whether the token serial number received by the second receiving module is stored in the cache, if yes, update a device identification which is related to a currently cached token serial number with the device identification received by the second receiving module; otherwise, store the device identification received by the second receiving module and the related token serial number into the cache; and
a pushing module, configured to receive a pushing request, select the mobile terminal token according to the currently cached device identification and the related token serial number, and send a pushing massage to the mobile terminal token,
whereby in the process that the mobile terminal token is triggered by the authentication server, a network data link between the authentication server and the mobile terminal token is built, and a corresponding relation between user information and the network data link is stored in the authentication server, an access address is stored inside when the mobile terminal token is started, and the authentication server is accessed according to the access address, and a network data link between the mobile terminal token and the authentication server, which is a network data link suitable for a TCP protocol, is rebuilt, and then the mobile terminal token sends token information to the authentication server via the network data link, and the authentication server obtains the token information correspondingly stored in a storage area of the server, and the stored token information is updated as the received token information in the case that the received token information is different from the stored token information.

* * * * *